United States Patent
Karaoguz et al.

(10) Patent No.: US 8,959,245 B2
(45) Date of Patent: Feb. 17, 2015

(54) MULTIPLE PATHWAY SESSION SETUP TO SUPPORT QOS SERVICES

(75) Inventors: Jeyhan Karaoguz, Irvine, CA (US); James Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 1371 days.

(21) Appl. No.: 12/323,402

(22) Filed: Nov. 25, 2008

(65) Prior Publication Data

US 2010/0131672 A1 May 27, 2010

(51) Int. Cl.
- *G06F 15/16* (2006.01)
- *H04L 12/701* (2013.01)
- *H04L 12/707* (2013.01)
- *H04L 12/725* (2013.01)

(52) U.S. Cl.
CPC ............... *H04L 45/00* (2013.01); *H04L 45/22* (2013.01); *H04L 45/24* (2013.01); *H04L 45/302* (2013.01); *H04L 45/306* (2013.01); *H04L 45/308* (2013.01)
USPC .......................................... 709/238; 709/239

(58) Field of Classification Search
USPC ................................................ 709/238, 239
See application file for complete search history.

(56) References Cited

U.S. PATENT DOCUMENTS

| | | | |
|---|---|---|---|
| 6,983,330 B1 * | 1/2006 | Oliveira et al. | 709/239 |
| 7,275,103 B1 * | 9/2007 | Thrasher et al. | 709/224 |
| 8,005,095 B2 * | 8/2011 | Emmendorfer et al. | 370/395.53 |
| 8,171,162 B2 * | 5/2012 | Sheth | 709/242 |
| 2001/0032263 A1 * | 10/2001 | Gopal et al. | 709/227 |
| 2002/0101821 A1 * | 8/2002 | Feldmann et al. | 370/232 |
| 2002/0103631 A1 * | 8/2002 | Feldmann et al. | 703/22 |
| 2004/0030705 A1 * | 2/2004 | Bowman-Amuah | 707/100 |
| 2004/0087304 A1 * | 5/2004 | Buddhikot et al. | 455/426.2 |
| 2005/0270970 A1 * | 12/2005 | Patrick et al. | 370/216 |
| 2005/0273497 A1 * | 12/2005 | Patrick et al. | 709/206 |
| 2006/0129670 A1 * | 6/2006 | Mayer | 709/223 |
| 2008/0008210 A1 * | 1/2008 | Godlewski | 370/463 |
| 2008/0256553 A1 * | 10/2008 | Cullen | 719/313 |

FOREIGN PATENT DOCUMENTS

EP 1148691 A1 * 10/2001 ............. H04L 29/06

* cited by examiner

*Primary Examiner* — Kostas Katsikis
(74) *Attorney, Agent, or Firm* — Brinks Gilson & Lione

(57) ABSTRACT

A request from a user device is received for a service by a network management server via a communication network. The network management server determines multiple routes for delivering content associated with the requested service based on a provisioning profile for the user device. Content associated with the requested service is then delivered via the determined multiple routes. The provisioning profile is updated and includes preferred service types, desired QoS for one or more services, client account information, and/or client credit verification information. The network management server manages the delivery of the content associated with the requested service via the determined multiple routes. The content includes packets that are the same, which are communicated or delivered simultaneously via the determined multiple routes. The network management server allocates one or more of the determined multiple routes for delivering the content based on priorities associated with the routes.

20 Claims, 6 Drawing Sheets

MULTIPLE PATHWAY SESSION SETUP TO SUPPORT QOS SERVICES

CROSS-REFERENCE TO RELATED APPLICATIONS/INCORPORATION BY REFERENCE

NOT APPLICABLE.

FIELD OF THE INVENTION

Certain embodiments of the invention relate to communication systems. More specifically, certain embodiments of the invention relate to a method and system for multiple pathway session setup to support QoS services.

BACKGROUND OF THE INVENTION

With the increasing importance of the Internet as a commercial infrastructure and the increasing need for massive Internet based services such as Voice over Internet Protocol (VoIP), the operation of the IP network is becoming more important and complex than ever. Current Internet architecture is mostly based on the best effort (BE) model, where packets can be dropped indiscriminately in the event of congestion. Such an architecture attempts to deliver all traffic as soon as possible within the limits of its abilities. The BE model works well for some applications such as FTP and email. To attract more users, Internet service providers (ISPs) provides not only best-efforts services such as email but also various newly emerged real-time multimedia applications such as VoIP, Video-Conferencing and Video on-Demand (VoD). To this end, various technologies such as stream categorizing and traffic monitoring are utilized to meet QoS requirements associated with various IP based services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for multiple pathway session setup to support QoS services, substantially as shown in and/ or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multiple pathway session setup to support QoS services. In accordance with various embodiments of the invention, a user device transmits a request to a network management (NM) server for a service such as a VoIP call with an intended user device. The NM server is connected to an IP core network. Upon receiving the request, the NM server determines multiple routes for providing the requested service based on a provisioning profile associated with the user device. The determined multiple routes are used to communicate or deliver content for the requested service over the IP core network. The user device then utilizes the requested service via the determined multiple routes. The client provisioning information, which is accessible by the NM server, may be updated by communicating with the user of the user device through an access network and/or the IP core network. The provisioning profile comprises information such as, for example, preferred service types, desired QoS for particular services, client account information, and/ or client credit verification information. A load for the requested service is distributed over the determined multiple routes in various ways. For example, the NM server is configured to manage various components in the IP core network to communicate or deliver content for the service served over the determined multiple routes simultaneously. In this regard, the NM server is operable to enable communication or delivery of content for the associated service over the determined multiple routes simultaneously.

In one embodiment of the invention, in order to increase reliability, different sets of packets associated with content for the service are routed over different routes among the determined multiple routes to take advantage of diversity combining different paths. Moreover, the NM server may be configured to allocate the determined multiple route based on, for example, the route costs and/or route reliability levels. In this regard, the determined multiple routes are prioritized, for example, as one primary route and one or more secondary routes. The NM server is operable to communicate or deliver content for the requested service via the primary route alone, and/or via one or more of the secondary routes. In instances where the primary route QoS degrades, the NM server is configured to enable a soft handoff of the service to one or more secondary routes from the primary route. The soft handoff feature ensures a seamless user experience by delivering content for the service over the determined alternate route prior to stopping delivering content for the service over the primary route. In addition, the NM server is operable to deliver content for the service over the primary route along with one or more secondary routes as a backup.

Figure 1:
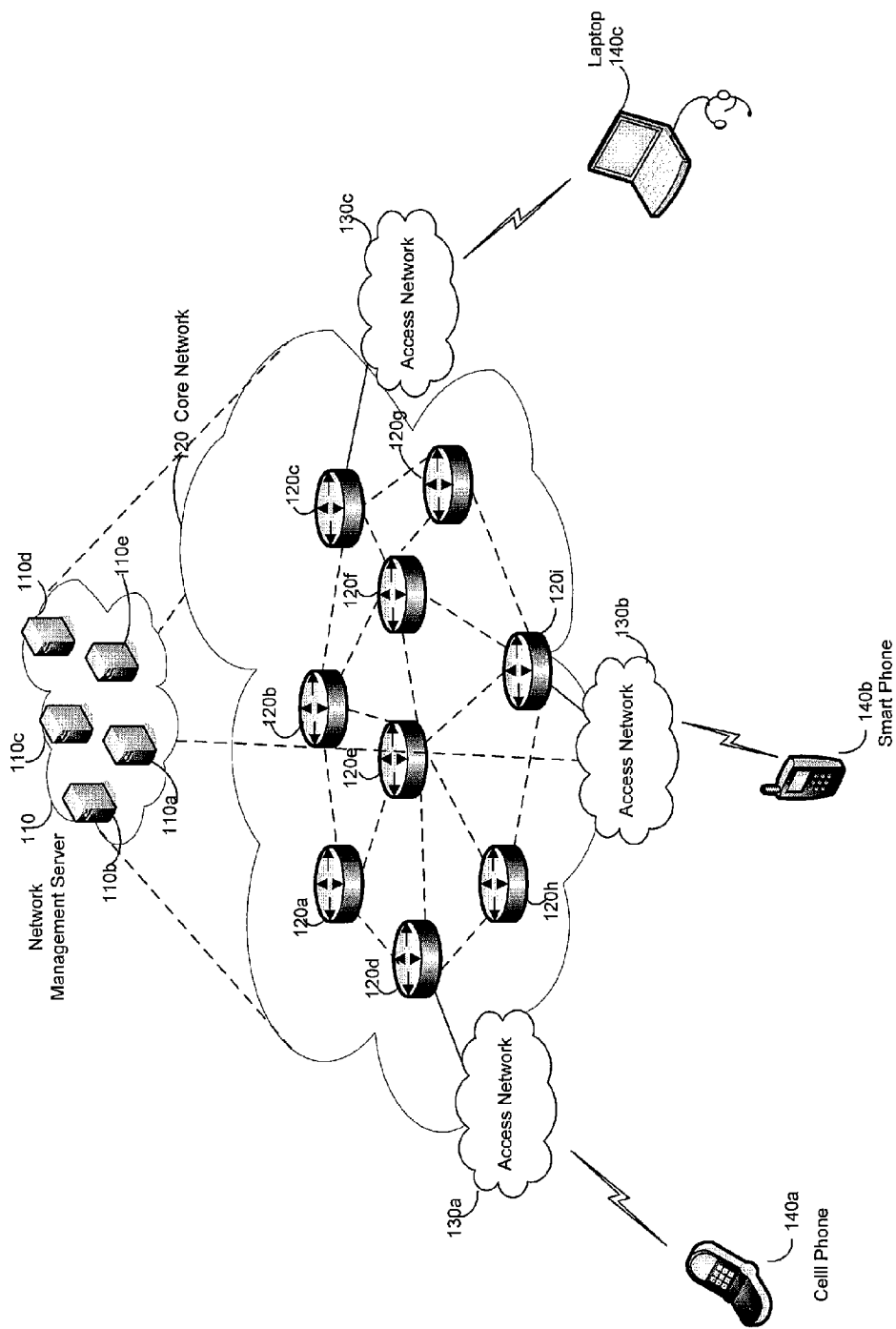
FIG. 1 is a system diagram illustrating an exemplary communication system that enables multiple pathway session setup to support QoS services, in accordance with an embodiment of the invention.

FIG. 1 is a system diagram illustrating an exemplary communication system that enables multiple pathway session setup to support QoS services, in accordance with an embodiment of the invention. Referring to FIG. 1, there is shown the system of FIG. 1 comprises a plurality of network management (NM) servers 110*a*-110*e*, that are collectively referenced as network management servers 110, a core network 120 comprising a plurality of routers 120a-120i, a plurality of access networks 130a-130c, a plurality of user devices, of which a cell phone 140a, a smartphone 140b, and a laptop 140c are presented.

Each of the NM servers 110 such as the NM server 110a comprises suitable logic, circuitry and/or code that are operable to manage various aspects of network communications such as, for example, selecting access network that a client such as the cell phone 140a uses to access the core network 120 and determining core network routes for forwarding various client packet streams toward intended recipients. The NM server 110a is configured to manage client registration and client provisioning. In this regard, the client provisioning may be performed automatically and/or manually via user inputs. The client provisioning information comprises, for example, preferred Internet Service Provider (ISP), preferred services, a username tied to the account, and associated billing information. In this regard, the client provisioning information such as the preferred services is used to enable a multipath connection call. The NM server 110a is also operable to handle associated client locations. For example, in a mobile IP environment, the NM server 110a manage clients' available IP addresses and forwards client packet streams for each connection session using appropriate IP address notified by corresponding clients.

Various client-server signaling messages such as a service setup request are processed at the NM server 110a. For example, upon receiving a service setup request message from a user device such as the cell phone 140a, the NM server 110a is operable to select a route to form a connection between the cell phone 140a and an intended peer user device such as the smartphone 140b. In this regard, the NM server 110a is configured to select multiple pathways (routes) to set up or establish the connection or connections for the requested service. Packets for the requested service are communicated or delivered via the selected multiple routes to enhance QoS for the service. To enable communications over the connection, a communication session, which indicates a sequence of client-server interactions within a timeframe, is created by the NM server 110a.

The NM server 110a is operable to generate a unique session ID for the created session and communicates with the cell phone 140a and the smartphone 140b, respectively. An associated session profile of the created session comprises various session parameters such as, for example, session ID, time stamp, type of service (ToS), user ID, and/or addresses and ports. The session profile is stored at the NM server 110a for later use. Session parameters are primarily used to influence server operations. For example, the NM server 110a is operable to establish, maintain, update, and/or terminate the session per defined communication session parameters. In this regard, the NM server 110a is configured to establish the communication session over one or multiple pathways at the service requests of associated user devices such as the cell phone 140a and/or the smartphone 140b. In the event that users of the cell phone 140a and/or the smartphone 140b are willing to gain a QoS enhanced service such as a VoIP call, the NM server 110a is operable to select multiple routes and establish the session over the selected multiple routes.

The core network 120 comprises suitable logic, circuitry and/or code that are operable to interface various access networks such as the access network 130a-130c with external data networks such as PDNs and the internet. There are a number of routers connected through links in the core network 120. Each router such as the router 120a comprises suitable logic, circuitry and/or code that are operable to forward packet streams to intended recipients. The router 120a is configured to exchange information such as link resource information for each link with one another. The link resource information comprises information of the resources available and information of the resources which have been reserved. Routers within the core network 120 are managed by the NM servers 110 in a unified way to allow easy and efficient maintenance thereof.

Various user devices such as the cell phone 140a comprise suitable logic, circuitry and/or code that enable various data communications via the access network 130a and/or the core network 120. The cell phone 140a is enabled to access various services via the NM server 110a, for example. The cell phone 140a is operable to to gain QoS enhancement for some preferred services. For example, in the event that the user of the cell phone 140a wishes to pay more for a QoS guaranteed VoIP call, the cell phone 140a is then provisioned for a multipath connection call at the NM server 110a.

In an exemplary operation, it is desirable for the cell phone 140a to perform a VoIP call with the smartphone 140b with desired QoS requirements. The cell phone 140a issues a service request to the NM server 110a with the required QoS. The NM server 110a is operable to select multiple routes for the requested service based on client provisioning information. The NM server 110a creates a communication session and generates associated session ID for implementing the requested service over the selected multiple routes. The NM server 110a then informs or notifies the cell phone 140a and the smartphone 140b of the generated session ID and corresponding access router addresses. The session is established over the selected multiple routes. The packets for the VoIP call are forwarded over the selected multiple routes towards intended recipients, accordingly. In the event that the multiple routes are prioritized, the NM server 110 is enabled to arrange the delivery of the VoIP packets over one or more routes of the prioritized multiple routes. The selection of the one or more routes is determined based on corresponding priority levels. For example, the primary route is considered first for delivering the VoIP packets to users of the cell phone 140a and/or the smartphone 140b.

Figure 2:
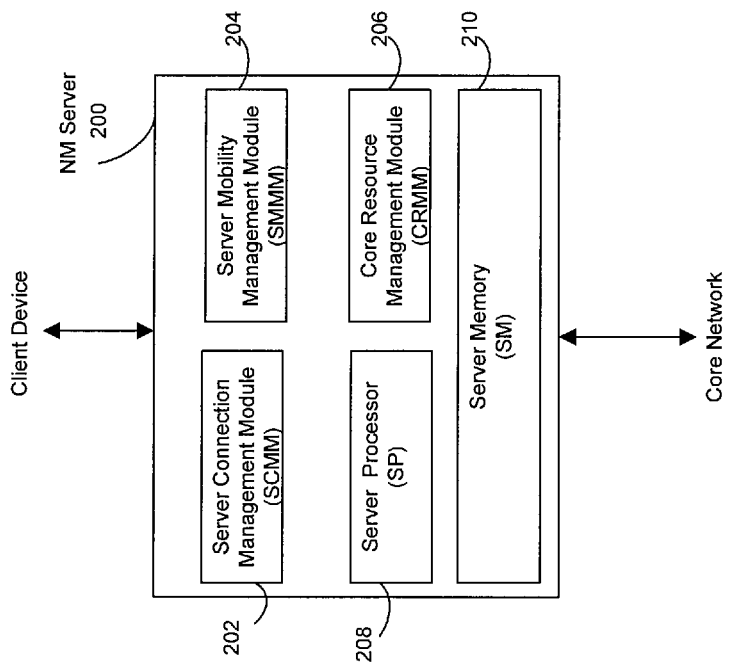
FIG. 2 is a block diagram illustrating an exemplary server device that is operable to enable multiple pathway session setup to support QoS services, in accordance with an embodiment of the invention.

FIG. 2 is a block diagram illustrating an exemplary server device that is operable to enable multiple pathway session setup to support QoS services, in accordance with an embodiment of the invention. Referring to FIG. 2, there is shown a NM server 200 comprising a server connection management module (SCMM) 202, a server mobility management module (SMMM) 204, a core resource management module (CRMM) 206, a server processor (SP) 208, and a server memory (SM) 210.

The SCMM 202 comprises suitable logic, circuitry and/or code that are operable to monitor network connectivity and handle various connection session signaling messages with clients such as the cell phone 140a and the smartphone 140b. The connection session signaling messages comprises various service or QoS request messages. For example, upon the receipt of a QoS message from a user device such as the cell phone 140a via the server processor (SP) 208, the SCMM 202 is configured to execute various operations related to admission control and route control. In this regard, the SCMM 202 is enabled to access the client provisioning information and set up a multipath connection to support the requested service. To set up the multipath connection, the SCMM 202 evaluates network resource status from the CRMM 206 and selects multiple routes and/or access networks for requested service. The information associated with the selected multiple routes and/or access networks are forwarded back to the SP 208 for further processing. The SCMM 202 is enabled to select the routes by using various algorithms stored in the SM 210. For example, each of the multiple routes is selected by maximizing available bandwidth over the route, or by minimizing the number of routers or hops across the route. Routes may also be selected based on cost of the route. Since higher cost routes may guarantee higher QOS, the higher cost routes may be chosen over lower cost routes to ensure higher quality QOS. The SCMM 202 is operable to maintain and release various routes within the core network 120.

The SMMM 204 comprises suitable logic, circuitry and/or code that is operable to manage mobility information such as, for example, client addresses and client locations for the system of FIG. 1. The SMMM 204 is configured to handle mobility information via various client address mappings to ensure a seamless user experience. The mobility information is provided to the SCMM 202, the CRMM 206, and the SP 208 such that packet streams for each active session are transmitted to intended recipients notified by respective clients.

The CRMM 206 comprises suitable logic, circuitry and/or code that is operable to handle route resource information according to various QoS requirements and system capabilities. In the event that a resource request from the SCMM 202 is received by the CRMM 206, the CRMM 206 evaluates resource status of the core network 120. The CRMM 202 provides core resource information such as status of routes with available resources in the core network 120, to the SCMM 202 to be used for various route selections.

The SP 208 comprises various types of processors or circuitry such as a microprocessor, a digital signal processor, an Application Specific Integrated Circuit (ASIC), or a combination of processing type devices. The SP 208 is operable to execute a plurality of software instructions, which are stored in the server memory (SM) 210 and downloaded for execution. In this regard, the SP 208 is configured to calculate session IDs for various connection sessions using various algorithms stored in the SM 210. The SP 208 is operable to communicate various information such as, for example, the route selection information from the SCMM 202, with clients via the core network 120 and various access networks such as the access network 130a.

The SM 210 comprises suitable logic, circuitry, and/or code that are operable to enable storage of data and/or other information utilized by the NM server 200. For example, the server memory 206 is utilized to store processed data generated by the SP 208. The SM 210 is also utilized to store information such as session profiles that are utilized to control various operations of the NM server 200. The SM 210 is operable to store information necessary to enable or disable a particular service for a given user device. The server memory 206 is also operable to store some executable instructions for, for example, a connection session set-up, session profile update, and/or connection session re-establishment via re-using updated session profiles. The SM 210 comprises RAM, ROM, low latency nonvolatile memory such as flash memory and/or other suitable electronic data storage capable of storing data and instructions.

In operation, the NM server 200 receives a service request message from a user device such as the cell phone 140a. The service request message comprises information such as the associated QoS requirements of the requested service, candidates of access networks that the cell phone 140a uses, and an identity of an intended peer user device such as the smartphone 140b. The SP 208 forwards the received service request information to the SCMM 202. The server connection management module 202 is enabled to communicate with the peer user device such as the smartphone 140b to confirm the received service request. If the smartphone 140b agrees to communicate with the cell phone 140a for the requested service, then, the SCMM 202 coordinates with the SMMM 204 to gain mobility information of the related clients. In instances where a multipath connection is requested by the cell phone 140a, the SCMM 202 communicates with the CRMM 206 to determine whether there are enough routes with available resources in the core network 120 for the requested service. The CRMM 206 then provides the core resource information to the SCMM 202. The core network resource information may comprise information regarding network nodes (routers), network node memory, and/or the links.

The SCMM 202 is operable to determine multiple routes and/or access networks based on the core resource information, accordingly. The SP 206 generates a session ID for communicating packet streams of requested service over the selected multiple routes between the two the smartphone 140 and the notebook computer 150. The generated session ID together with the selected access network information are communicated with related clients. In addition, an associated session profile comprising various session parameters such as session ID and type of service is created and stored in the SM 210 to be used for later communication. In the event that the SP 208 receives packets, which indicate that the received packets are associated with the generated session ID stored in the SM 210, the SP 208 is operable to communicate or deliver the packets over the selected multiple routes to corresponding recipient, accordingly.

Figure 3:
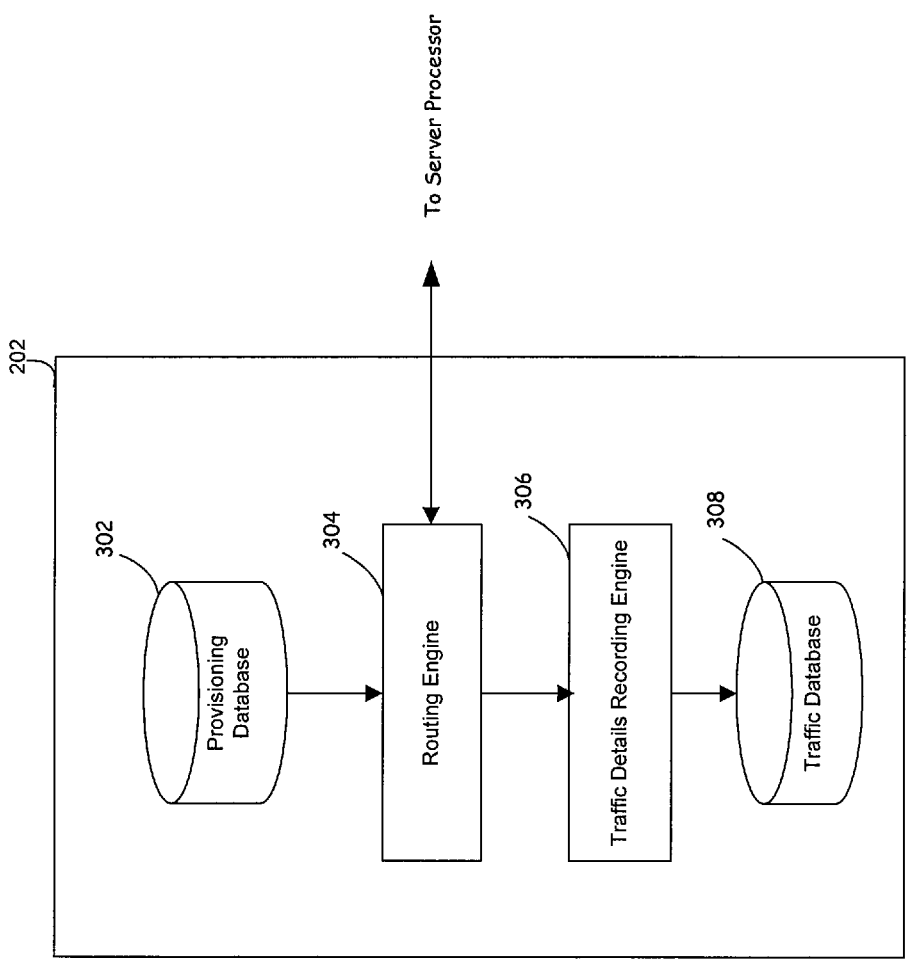
FIG. 3 is a block diagram illustrating an exemplary connection management module that enables multiple pathway session setup to support QoS services, in accordance with an embodiment of the invention.

FIG. 3 is a block diagram illustrating an exemplary connection management module that enables multiple pathway session setup to support QoS services, in accordance with an embodiment of the invention. Referring to FIG. 3, there is shown a connection management module 202 comprising a provisioning database 302, a routing engine 304, a traffic recording engine 306, and a traffic database 308.

The provisioning database 302 comprises suitable logic, circuitry and/or code that enable storage of information necessary to route particular calls over the Internet. For example, the information regarding client ID, client preferred services, client account, enhancing QoS for particular calls, client credit verification, and carrier trunk groups. The provisioning database 302 is stored in RAM, ROM, low latency nonvolatile memory such as flash memory and/or other suitable electronic data storage capable of storing data and instructions.

The routing engine 304 comprises suitable logic, circuitry and/or code that is operable to select various routes for the received service requests based upon one or more attributes such as, for example, the preferred carrier service provider, a desired Quality of Service (QoS), cost, or other factors. The routing information generated by the routing engine 304 comprises a destination router address, and/or a preferred Internet Service Provider, which are used for communicating the traffic or contend for the service to the Internet. In one embodiment of the invention, one or more exclusionary rules are applied to candidate routes based on known bad routes, provisioning information from the provisioning database 302, and/or other data. In this regard, the routing engine 304 utilizes provisioned client information stored in the provisioning database 302, for example, client preferred service, client account and billing information, to select multiple routes to forward packets of the requested service. In one embodiment of the invention, packets for the service are communicated through the selected multiple routes simultaneously. Traffic load are shared among the selected multiple routes. In this regard, the content or packets for selected multiple routes are queued based on, for example, corresponding route reliabilities. The corresponding traffic load is initially serviced by the primary route. In the event that service quality degrades over the primary route, the traffic load then is shared by some secondary selected routes or apportioned among the primary and second route so as to eliminate or mitigate the effects of the degradation.

The traffic recording engine 306 comprises suitable logic, circuitry and/or code that is operable to format traffic information about, for example, a VoIP call, such as the originator, recipient, date, time, duration, incoming trunk group, outgoing trunk group, call states, or other information, into a Call Detail Record (CDR). The CDR is stored in the traffic database 308, and is used to generate billing information for network services.

The traffic database 308 comprises suitable logic, circuitry and/or code that enable storage of CDR data from the traffic recording engine 306. The CDR data are stored in a preferred format to facilitate storage of the CDR data. The CDR data is utilized to support customer billing for network services. The traffic database 308 is stored in RAM, ROM, low latency nonvolatile memory such as flash memory and/or other suitable electronic data storage capable of storing data and/or instructions.

In operation, the routing engine 304 of the SCMM 202 receives a service request for a VoIP call between the cell phone 140a and the smartphone 140b The cell phone 140a initiated the request. Up receiving the request, the routing engine 304 then evaluates the client provisioning information of the cell phone. In the event that the provisioning information stored in the provisioning database 302 of the cell phone 140a indicates that a desired QoS required for this call request. The routing engine 304 selects multiple routes to support the requested VoIP call. The traffic information is recorded in the traffic details recording engine 305 as CDR data. The CDR data are saved in the traffic database 308 for supporting customer billing of the network service.

Figure 4:
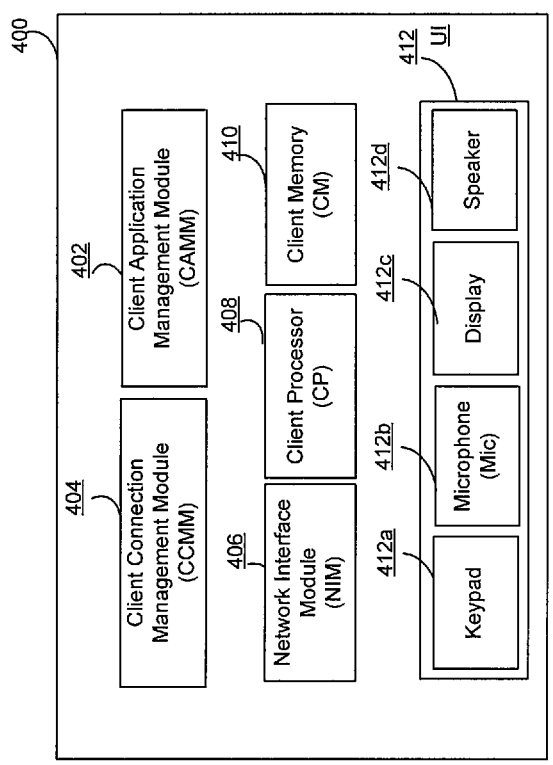
FIG. 4 is a block diagram illustrating an exemplary user device that is operable to support a multipath connection call, in accordance with an embodiment of the invention.

FIG. 4 is a block diagram illustrating an exemplary user device that is operable to support a multipath connection call, in accordance with an embodiment of the invention. Referring to FIG. 4, there is shown a user device 400 comprising a client application management module (CAMM) 402, a client connection management module (CCMM) 404, a network interface module (NIM) 406, a client processor (CP) 408, a client memory (CM) 410, and a user interface (UI) 412 comprising a keypad 412a, a microphone (Mic) 412b, a display 412c, and a speaker 412d, respectively.

The CAMM 402 comprises suitable logic, circuitry, and/or code that are operable to manage various application requirements and status. The various application requirements may comprise information regarding best user quality and QoS attributes. The application status may indicate that, for example, the corresponding service is reserved and/or resumed. The CAMM 402 is configured to monitor the fixed and variable port numbers used for identifying and monitoring application data.

The CCMM 404 comprises suitable logic, circuitry, and/or code that are operable to monitor network connectivity as well as the available bandwidth, transmission delay, and error rate of the connected access networks such as the access networks 130a-130c. The CCMM 404 is configured to handle various connection session signaling messages with the NM server 110a, for example, to access services with desired QoS, via the CP 308. The connection session signaling messages comprises various service request messages such as a QoS request message provided by the CAMM 402.

The NIM 406 comprises suitable logic, circuitry, and/or code that are operable to transmit and/or receive radio signals over an access network which is coupled with the core network 120. The access network may be wired or wireless. The communicated radio signals comprise information from the core network 120 which is managed via the NM server 110.

The CP 408 comprises suitable logic, circuitry, and/or code that are enabled to control and/or data processing operations for the user device 400. The CP 408 is operable to process signals to communicate with a supporting communication network. In this regard, the signals comprise various service signaling messages such as a QoS request message. The user device 400 is operable to signal the NM servers 110 for communication session establishment/re-establishment which enables communication of packet streams to intended recipients over the core network 120. In this regard, the CP 408 is configured to communicate with the NM servers 110 to provide and/or modify client provisioning parameters such as client account information and desired QoS for particular preferred services. The CP 408 is enabled to perform client provisioning automatically with predetermined user configuration profile stored in the CM 410 and/or manually with user inputs via, for example, the keypad 412a and/or the microphone 412b.

The user interface 412 comprises suitable logic, circuitry and/or code that service the user device 400 via entering user inputs and/or presenting various services to users. The user interface 412 comprises the keypad 412a, the microphone (Mic) 412b, the display 412c, the speaker 412d, and/or any other type of interfaces that are employed by the user device 400. In the event that a user of the user device 400 is not satisfied with received QoS, the user is allowed to enter user input(s) via, for example, the keypad 412a and/or the microphone 412b to provide and/or modify client provisioning information such as, for example, the user is willing to pay more to enhance the QoS of the on-going service.

The CM 410 comprises suitable logic, circuitry, and/or code that enable storage of data and/or other information utilized by the CP 408. For example, the CM 410 is utilized to store processed data generated by the CP 408. The CM 410 is operable to store information, such as user device configuration information, that is utilized to control various operations of the user device 400. Some software and/or code stored in the CM 410 are used to translate user input operations via the keypad 412a and/or the microphone 412b into identifiable triggering events to the CP 308 for performing client provisioning with the NM server 110. Communication session information such as associated access router IP addresses and session ID received from the NM servers 110 is stored in the memory 410. The CM 410 is operable to store some executable instructions for running various services on the user device 400.

In operation, in the event that the user device 400 wishes to communicate with a peer user device. The CAMM provides the CP 408 with client application requirements and/or a port number used to identify the client application data at the user device 400. Exemplary client application requirements comprise service type of the application and various QoS attributes such as bit rate and delay constrains associated with the application. The CCMM 404 passes an identity of the peer device such as a telephone number and IP address of a NM server such as the NM server 110a to the CP 408. The CP 408 then issues a service request to the NM server 110a via the NIM 406. The service request represents a request to initiate a connection session with the NM server 110a for a desired QoS with the peer device. Upon receiving a response via the NIM 406 from the NM server 110a, the CP 408 is operable to extract connection session information such as a session ID and access router address from the response and store in the CM 410. The CP 408 is enabled to communicate packet streams associated with the requested service through the NIM 406 according to the established connection session. The received service is presented to the user via the user interface 412 such as the display 412c and/or the speaker 412d, respectively. The CP 408 is operable to provide and/or modify provisioning information regarding user preferred QoS level for the requested service via the NIM 406 before and/or during the requested service established.

Figure 5:
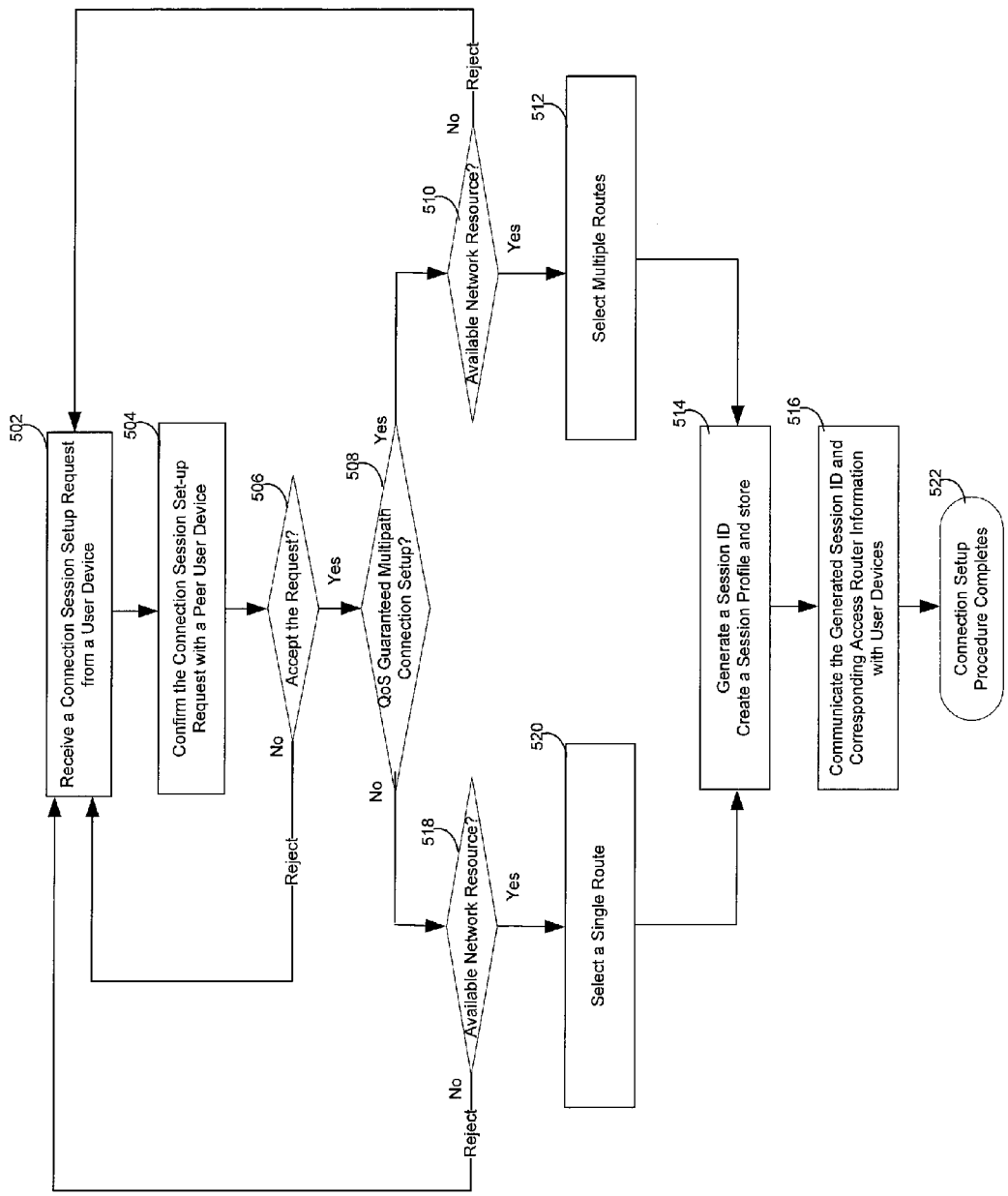
FIG. 5 is a flow chart illustrating an exemplary multipath connection session setup procedure, in accordance with an embodiment of the invention.

FIG. 5 is a flow chart illustrating an exemplary multipath connection session setup procedure, in accordance with an embodiment of the invention. Referring to FIG. 5, the exemplary steps start with the step 502, where a NM server such as the NM service device 110a receives a connection session setup request from a user device such as the cell phone 140a. The received request comprises information such as, for example, a client application QoS profile (client application requirements), identifiers, candidate access networks that the cell phone 140 uses. The identifiers comprises, for example, IP address of the NM server 110a, port numbers used for identifying application data, destination user device name or address. In step 504, upon receiving the request, the NM server 110a communicates with the indented user device such as the smartphone 140b to confirm the received request.

In step 506, the NM server 110a determines whether the smartphone 140b will accept or honor the request. In instances where the smartphone 140b accepts or honors the request, then in step 508, the NM server 110a evaluates client provisioning profiles stored in the provisioning database 302 to determine actual resource needed such as, for example, a QoS guaranteed multipath connection setup, for the requested service. In instances where the NM server 110a determines that a multipath connection setup is required for the requested service based on corresponding client provisioning profiles, then in step 510, the NM server 110a determines whether the core network 120 has available resources to be provided for the requested service. In instances where the NM server 110a determines that there are available resources provided for the requested service in the core network 120, then in step 512, where the NM server 110a selects multiple routes for the requested service based on corresponding client provisioning profile.

In step 514, the NM server 110a generates a session ID for the selected multiple routes. A session profile, which comprises session parameters such as, for example, session ID, time stamp, QoS requirements, type of service, Codec type, user ID, and router IP address, is created and stored in the SM 210 to be used for later communication. In step 516, the NM server 110a communicates the generated session ID and access router information such as the corresponding access router IP addresses for the cell phone 140a or the smartphone 140b to access. The exemplary connection setup procedure stops in step 522.

In step 506, in instances where the cell phone 140a does not accept the request, then the NM server 110a signals the cell phone 140 for the rejection decision and the exemplary steps return to the step 502. In step 508, in instances where the NM server 110a determines that a multipath connection setup is not required for the requested service based on corresponding client provisioning profiles, then in step 518, the NM server 110a determines whether the core network 120 has available resources for the requested service. In instances where the NM servers 110 determines that there are available resources for the requested service in the core network 120, then in step 520, the NM server 110a selects a single route for the requested service based on corresponding client provisioning profile. The exemplary steps continue in step 514.

In step 510, in instances where the NM server 110a determines that there are no available resources for the requested service in the core network 120, then the NM server 110a signals the cell phone 140a for the rejection decision and the exemplary steps return to the step 502. In step 518, in instances where the NM server 110a determines that there are no available resources provided for the requested service in the core network 120, then the NM server 110a signals the cell phone 140a for the rejection decision and the exemplary steps return to the step 502.

Figure 6:
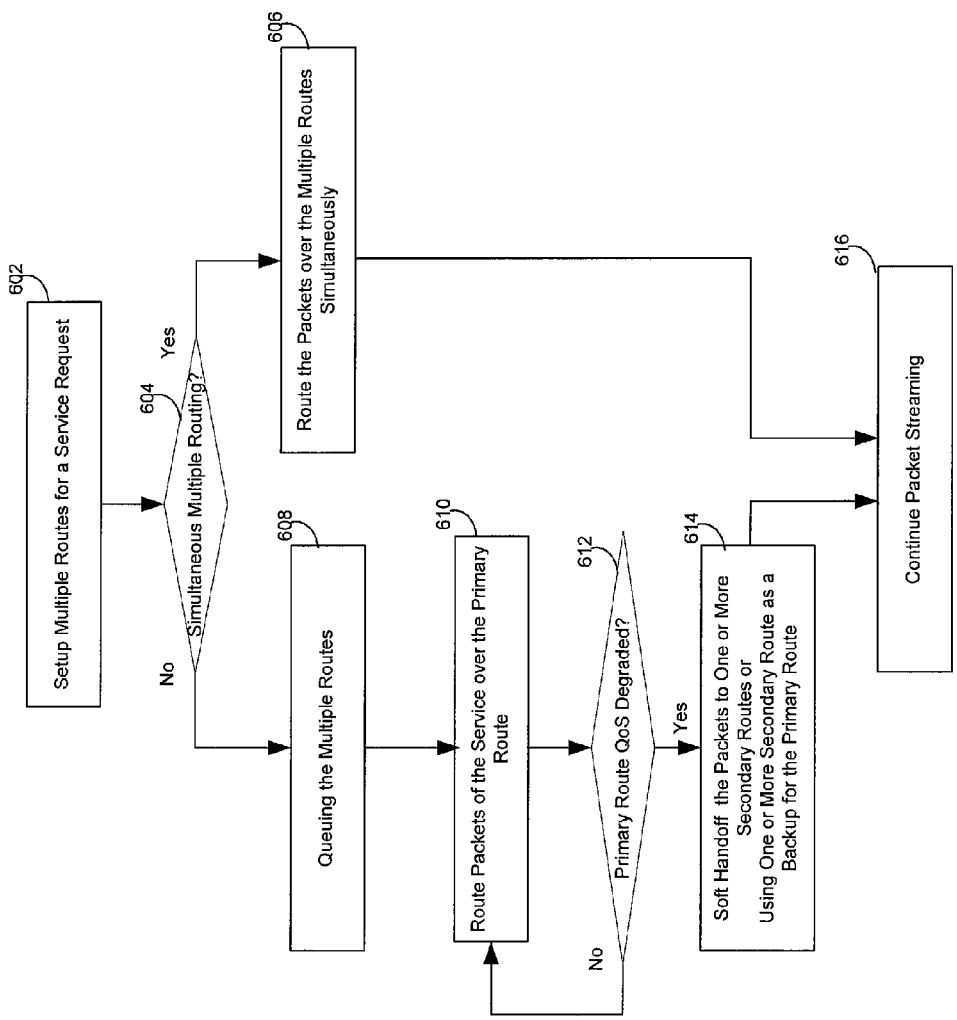
FIG. 6 is a flow chart illustrating exemplary multipath connection packet routing, in accordance with an embodiment of the invention.

FIG. 6 is a flow chart illustrating exemplary multipath connection packet routing, in accordance with an embodiment of the invention. Referring to FIG. 6, the exemplary steps start with the step 602, where a multipath connection session has been setup as described in FIG. 5. In step 604, the NM server 110a determines whether packets streams for the requested service are routed over the selected multiple routes simultaneously. In instances where simultaneous multiple routing is applied for packet forwarding, then in step 606, where the NM server 110a manage the access routers to communicate or deliver the packets over the selected multiple routes simultaneously. The exemplary steps proceed with continuing packet streaming in step 616. In step 604, in instances where simultaneous multiple routing is not required for packet forwarding, then in step 608, the NM server 110a queues the selected and may rank the selected multiple routes from best to worst, for example. In step 610, the packets are forwarded over the primary route. The ranking may be updated during the communication session. In step 612, the NM server 110a determines whether the QoS over the primary route is degraded. In instances where the QoS over the primary route is degraded, then in step 614, soft handoff the packets from the primary route to one or more secondary routes. Alternatively, packets are forwarded over the primary route together with one or more secondary route as a backup. The exemplary steps continue in step 616. The use of soft handoff enables the service being delivered over the one or more secondary routes prior to stopping the delivery of contents for the service over the primary route.

Aspects of a method and system for multiple pathway session setup to support QoS services are provided. In accordance with various embodiments of the invention, a user device such as the cell phone 140a transmits a request to the NM server 110a for a service such as a VoIP call with an intended user device such as the smartphone 140b. The NM server 110a is connected to the core network 120. Upon receiving the request, the NM server 110a determines multiple routes for the requested service based on a provisioning profile of the user device. The determined multiple routes are used to communicate or deliver content for the requested service over the core network 120. The cell phone 140a then utilizes the requested service via the determined multiple routes.

The client provisioning information stored in the NM server 110a may be updated by the user of the cell phone 140a through the access network 130a and/or the core network 120. The provisioning profile comprises information such as, for example, preferred service types, desired QoS for particular services, client account information, and/or client credit verification information. A load for the requested service is distributed over the determined multiple routes in various ways. For example, the NM server 110a is configured to manage various components in the core network 120 to deliver content for the service served over the determined multiple routes simultaneously. In this regard, the NM server 110a is operable to enable routing same packets associated with the service over the determined multiple routes simultaneously. In some embodiments of the invention, different sets of packets associated with the service may be routed over different routes among the determined multiple routes. Moreover, the NM server 110a may be configured to allocate the determined multiple route based on, for example, the route cost and/or route reliability levels. The determined multiple routes are prioritized, for example, as one primary route and a plurality of secondary routes.

The NM server 110a is enabled to route the requested service over the primary route alone, or with assistances of one or more secondary routes. In instances where the primary route QoS degrades, the NM server 110a is configured to enable a soft handoff the service to one or more secondary routes from the primary route. The soft handoff feature provides a seamless user experience by delivering content for the service over the determined alternate route prior to stopping delivering content for the service over the primary route. In addition, the NM server 110a is operable to deliver content for the service over the primary route along with one or more secondary routes as a backup.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for multiple pathway session setup to support QoS services.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   receiving from a user device, by a network management server via a communication network, a request for a service;
   determining multiple routes for delivering content associated with said requested service based on a provisioning profile for said user device; and
   delivering said content associated with said requested service via said determined multiple routes.

2. The method according to claim 1, comprising updating said provisioning profile.

3. The method according to claim 1, wherein said provisioning profile comprises preferred service types, desired QoS for one or more services, client account information, and/or client credit verification information.

4. The method according to claim 1, comprising managing via said network management server, said delivery of said content associated with said requested service via said determined multiple routes.

5. The method according to claim 4, comprising managing via said network management server, simultaneous communication of packets that are the same which are associated with said requested service via said determined multiple routes.

6. The method according to claim 1, comprising allocating via said network management server, one or more of said determined multiple routes based on priority.

7. The method according to claim 1, wherein said determined multiple routes comprises a primary route and one or more secondary routes.

8. The method according to claim 7, comprising determining via said network management server, whether to utilize said primary route, and/or any of said one or more of said secondary routes for delivering said content associated with said requested service.

9. The method according to claim 7, comprising handing off via said network management server, said requested service from said primary route to said one or more secondary routes.

10. The method according to claim 7, comprising balancing via said network management server, a load associated with said delivery of said content via said primary route and said one or more secondary routes.

11. A system for communication, the system comprising:
    one or more circuits for use in a network management server, wherein said one or more circuits are operable to receive, from a user device by a network management server via a communication network, a request for a service;
    said one or more circuits are operable to determine multiple routes for delivering content associated with said requested service based on a provisioning profile for said user device; and
    said one or more circuits are operable to deliver said content associated with said requested service via said determined multiple routes.

12. The system according to claim 11, wherein said one or more circuits are operable to update said provisioning profile.

13. The system according to claim 11, wherein said provisioning profile comprises preferred service types, desired QoS for one or more services, client account information, and/or client credit verification information.

14. The system according to claim 11, wherein said one or more circuits are operable to manage via said network management server, said delivery of said content associated with said requested service via said determined multiple routes.

15. The system according to claim 14, wherein said one or more circuits are operable to manage via said network management server, simultaneous communication of packets that are the same which are associated with said requested service via said determined multiple routes.

16. The system according to claim 11, wherein said one or more circuits are operable to allocate via said network management server, one or more of said determined multiple routes based on priority.

17. The system according to claim 11, wherein said determined multiple routes comprises a primary route and one or more secondary routes.

18. The system according to claim 17, wherein said one or more circuits are operable to determine via said network management server, whether to utilize said primary route, and/or any of said one or more of said secondary routes for delivering said content associated with said requested service.

19. The system according to claim 17, wherein said one or more circuits are operable to hand off via said network management server, said requested service from said primary route to said one or more secondary routes.

20. The system according to claim 17, wherein said one or more circuits are operable to balance via said network management server, a load associated with said delivery of said content via said primary route and said one or more secondary routes.

* * * * *